United States Patent
Hari Krishnan et al.

(10) Patent No.: US 11,068,259 B2
(45) Date of Patent: Jul. 20, 2021

(54) MICROSERVICE-BASED DYNAMIC CONTENT RENDERING

(71) Applicant: T-Mobile USA, Inc., Bellevue, WA (US)

(72) Inventors: Sandeep Shankar Hari Krishnan, Bothell, WA (US); Hamza Syed, Bothell, WA (US); Charlie Ang, Seattle, WA (US); Sumeet Prakash, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/240,416

(22) Filed: Jan. 4, 2019

(65) Prior Publication Data

US 2020/0218532 A1    Jul. 9, 2020

(51) Int. Cl.
*G06F 9/44* (2018.01)
*G06F 9/455* (2018.01)
*G06F 8/71* (2018.01)
*G06F 16/958* (2019.01)
*H04L 29/06* (2006.01)
*G06F 8/77* (2018.01)
(Continued)

(52) U.S. Cl.
CPC .................. *G06F 8/71* (2013.01); *G06F 8/30* (2013.01); *G06F 8/44* (2013.01); *G06F 8/77* (2013.01); *G06F 9/44521* (2013.01); *G06F 9/4552* (2013.01); *G06F 9/547* (2013.01); *G06F 16/986* (2019.01); *H04L 63/0884* (2013.01)

(58) Field of Classification Search
CPC ..... G06F 8/71; G06F 8/30; G06F 8/44; G06F 8/77; G06F 9/44521; G06F 9/4552; G06F 9/547; G06F 16/986; H04L 63/0884
See application file for complete search history.

(56) References Cited

U.S. PATENT DOCUMENTS 6,456,308 B1    9/2002   Agranat et al.
6,523,027 B1    2/2003   Underwood
(Continued)

OTHER PUBLICATIONS

Microsoft, Microservices architecture, 2018, pp. 1-4. https://docs.microsoft.com/en-us/dotnet/architecture/microservices/architect-microservice-container-applications/microservices-architecture (Year: 2018).*

(Continued)

*Primary Examiner* — Mongbao Nguyen
(74) *Attorney, Agent, or Firm* — Han Santos, PLLC

(57) ABSTRACT

An application code is executed to generate application web page code for an application web page. An application framework is invoked according to a script in the application code to support retrieval of feature codes from a Feature as a Service (FaaS) data store and content codes from a Content as a Service (CaaS) data store. A feature code of a feature is retrieved via a corresponding Representational State Transfer (REST)ful web service from the FaaS data store. The feature code is executed to generate feature presentation code that is incorporated into the application web page code. A content code is retrieved via a corresponding RESTful web service from the CaaS data store. The content code is executed to retrieve specific content for the feature from a content data store and incorporated with the feature presentation code. The application web page code is sent to a web browser for rendering.

20 Claims, 7 Drawing Sheets

(51) Int. Cl.
*G06F 8/41* (2018.01)
*G06F 8/30* (2018.01)
*G06F 9/445* (2018.01)
*G06F 9/54* (2006.01)

(56) References Cited

U.S. PATENT DOCUMENTS

| | | |
|---|---|---|
| 6,601,233 B1 | 7/2003 | Underwood |
| 6,640,238 B1 | 10/2003 | Bowman-Amuah |
| 6,640,249 B1 | 10/2003 | Bowman-Amuah |
| 7,013,289 B2 | 3/2006 | Horn et al. |
| 7,269,822 B2 | 9/2007 | Gebhart et al. |
| 7,577,938 B2 | 8/2009 | Bent et al. |
| 7,761,591 B2 | 7/2010 | Graham |
| 7,890,923 B2 | 2/2011 | Elaasar |
| 7,966,370 B1 | 6/2011 | Pegg et al. |
| 8,375,358 B2 * | 2/2013 | Baldwin .................. G06F 8/38 717/114 |
| 8,458,648 B2 | 6/2013 | Dangeville et al. |
| 8,543,973 B2 | 9/2013 | Nguyen et al. |
| 8,655,826 B1 | 2/2014 | Drewry et al. |
| 8,856,735 B2 | 10/2014 | Nimashakavi et al. |
| 8,898,658 B2 | 11/2014 | Ciccone |
| 8,997,038 B2 | 3/2015 | Bozek et al. |
| 9,003,361 B2 | 4/2015 | Pasternak |
| 9,471,405 B1 | 10/2016 | Mor |
| 9,509,779 B2 | 11/2016 | Yoda |
| 9,710,794 B2 | 7/2017 | Hardin et al. |
| 9,754,028 B2 | 9/2017 | Brake et al. |
| 9,800,644 B2 | 10/2017 | Jemâa |
| 9,875,086 B1 | 1/2018 | Anderson et al. |
| 9,916,137 B2 | 3/2018 | Chouhan |
| 10,048,830 B2 * | 8/2018 | Jose .................. G06F 3/04817 |
| 10,257,673 B1 | 4/2019 | Smith et al. |
| 10,326,864 B2 * | 6/2019 | Jose .................. H04L 41/06 |
| 10,417,593 B1 | 9/2019 | Norbeck et al. |
| 10,430,440 B2 | 10/2019 | Llaves et al. |
| 10,476,936 B1 | 11/2019 | Retnakumari et al. |
| 10,554,785 B2 | 2/2020 | Thangeswaran |
| 10,586,033 B2 | 3/2020 | Brocious et al. |
| 10,606,576 B1 | 3/2020 | Tung et al. |
| 2005/0246712 A1 | 11/2005 | Ferris |
| 2012/0096093 A1 * | 4/2012 | Bouw .................. H04L 43/04 709/206 |
| 2014/0047413 A1 * | 2/2014 | Sheive .................. G06F 8/30 717/110 |
| 2015/0100406 A1 * | 4/2015 | Klimetschek ...... G06Q 30/0242 705/14.41 |
| 2015/0378691 A1 * | 12/2015 | Chouhan .................. G06F 9/547 717/106 |
| 2016/0092590 A1 * | 3/2016 | Song .................. G06F 16/9577 715/234 |
| 2017/0161253 A1 * | 6/2017 | Silver .................. G06F 17/248 |
| 2018/0081645 A1 * | 3/2018 | Alurralde Iturri ......... G06F 8/38 |
| 2018/0329738 A1 * | 11/2018 | Kasha .................. G06F 9/46 |
| 2019/0018709 A1 * | 1/2019 | Becker .................. G06F 9/5038 |
| 2019/0220289 A1 * | 7/2019 | Driesen .................. G06F 8/36 |
| 2019/0320038 A1 * | 10/2019 | Walsh .................. H04L 41/5051 |
| 2019/0339947 A1 * | 11/2019 | McCune .................. G06F 8/30 |
| 2020/0125713 A1 * | 4/2020 | Davis .................. H04L 67/02 |
| 2020/0133651 A1 * | 4/2020 | Holzer .................. G06F 8/33 |
| 2020/0151038 A1 * | 5/2020 | Lingamneni ............. G06F 8/31 |
| 2020/0218516 A1 | 7/2020 | Harikrishnan |

OTHER PUBLICATIONS

Michael Hofmann, Microservices Best Practices for Java, 2016 pp. 1-134. https://www.redbooks.ibm.com/redbooks/pdfs/sg248357.pdf (Year: 2016).*

Ferdinand Mutsch, Design of a Linked Data-enabled Microservice Platform for the Industrial Internet of Things, 2016, p. 1-95. https://publikationen.bibliothek.kit.edu/1000061764 (Year: 2016).*

Andy Neumann, An Analysis of Public REST Web Service APIs, 2018, pp. 1-14. https://ieeexplore.ieee.org/document/8385157 (Year: 2018).*

Florian Haupt, A Framework for the Structural Analysis of REST APIs, 2017, pp. 55-58. https://ieeexplore.ieee.org/stamp/stamp.jsp?tp=&arnumber=7930199 (Year: 2017).*

Al-Zoubi etal, "Performing Distributed Simulation With Restful Web-Services", IEEE, 1323-1334 (Year: 2009).

Christensen, "Using RESTful Web-Services and Cloud Computing to Create Next Generation Mobile Applications", ACM., pp. 627-633 (Year: 2009).

Davis et al, XML Technologies for RESTful Services Development:, ACM, pp. 26-32 (Year: 2011).

Fernandes et al, "Performance Evaluation of RESTful Web Services and AMQP Protocol", IEEE, pp. 810-815 (Year: 2013).

Han et al, "A RESTful Approach to the Management of Cloud Infrastructure", IEEE, pp. 139-142 (Year: 2009).

Jiang et al, "Large-Scale Longitudinal Analysis of SOAP-Based and RESTfulWeb Services", IEEE, pp. 218-225 (Year: 2012).

Khorasgani, et al, "Web Service Matching for RESTfulWeb Services", IEEE, pp. 115-124 (Year: 2011).

Kopeck'y et al, "hRESTS: an HTML Microformat for Describing RESTfulWeb Services", IEEE, pp. 619-625 (Year: 2008).

Laitkorpi et al, "Towards a Model-Driven Process for Designing ReSTful Web Services", IEEE, pp. 173-180 (Year: 2009).

Meng et al,"RESTful Web Services: a Solution for Distributed Data Integration", IEEE, pp. 1-4 (Year: 2009).

Pautasso et al, "RESTful Web Services vs. "Big" Web Services: Making the Right Architectural Decision", ACM, pp. 805-814 (Year:2008).

Schreibmann et al, Model-driven Development of RESTful AP Is, In Proceedings of the 11th International Conference on Web Information Systems and Technologies (WEBIST-2015), pp. 5-14 (Year: 2015).

U.S. Appl. No. 16/240,391, Notice of Allowance dated Jan. 1, 2021, 90 pages.

U.S. Appl. No. 16/240,391, Office Action dated Apr. 20, 2020, 27 pages.

U.S. Appl. No. 16/240,691, Notice of Allowance dated Sep. 4, 2020, 47 pages.

Wursch etal, "SDK Reinvented: Document Image Analysis Methods as RESTful Web Services", IEEE, pp. 90-95 (Year: 2016).

Zhao et al, "Towards Automated RESTful Web Service Composition", IEEE, pp. 189-196 (Year: 2009).

* cited by examiner

MICROSERVICE-BASED DYNAMIC CONTENT RENDERING

BACKGROUND

Enterprise level software applications provide solutions for critical business operations of organizations. These operations may include customer billing, access authorization, product shipment, and service fulfillment. These solutions are administered through software modules that are presented via web portals. Traditional enterprise software platforms like SAP or Peoplesoft require software module development through homogeneous sets of technologies, programming languages, and tools. Such a development model restricts organizations to employing highly skilled professionals trained specifically in these technologies. Accordingly, organizations may be forced to invest a large amount of effort in finding and hiring software developers with the right skill sets, training, certifications, etc. Further, organizations may use a considerable amount of human resource management time and overhead to assign such software developers to new projects that are suited to their skills once they complete existing projects.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
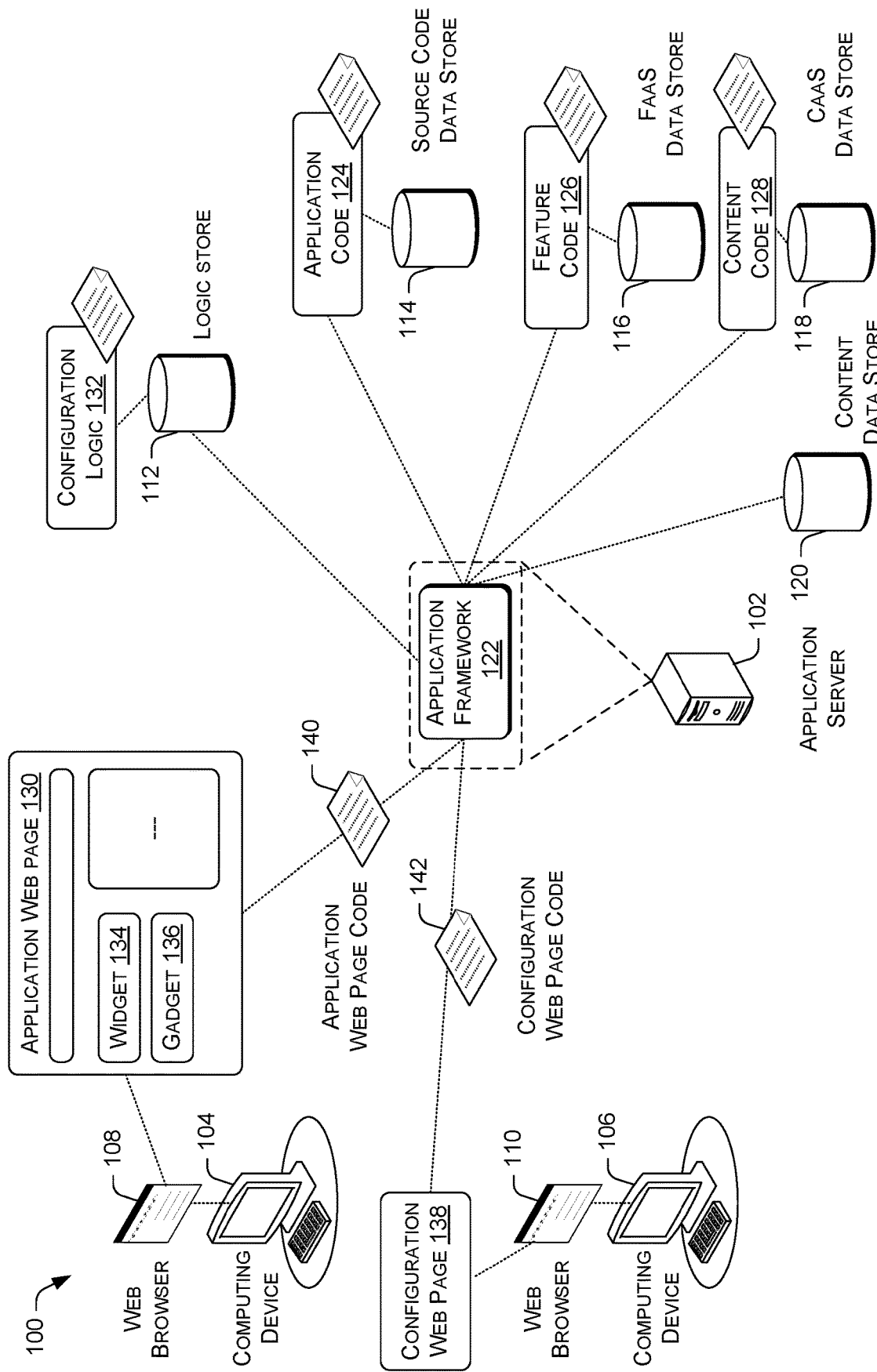
FIG. 1 illustrates an example architecture that implements a programming language agnostic microservice-based software environment.

This disclosure is directed to techniques for enabling software developers with different training and skills to develop software components for a web application in various programming languages and application development environments. The techniques use Feature as a Service (FaaS) and Content as a Service (CaaS) principles to enable such software developers to create a set of features from various programming language and application development environments that may be used by different developers. In turn, the features may be presented to a user in an application web page that is served by an application server. This means that each feature is accessible through its own corresponding microservice. As used herein, a microservice is computer functionality that is available as a service, that is, the computer functionality is exposed programmatically via web protocols and Representational State Transfer (REST) principles. Further, the serving metadata for describing the binding information for the features are added dynamically at the runtime of the application web page. For example, the binding information may describe the fields and formats for the data in the features. The application server also uses the serving metadata to determine how to map specific content to the features in a just-in-time fashion at runtime, in which the content is then published to the features using microservices.

The features may include software widgets and software gadgets that perform multiple functions. A software widget is an element of a graphical user interface (GUI) that displays information in response to a user input or provides a specific way for a user to interact with an application. On the other hand, a software gadget is a small computer program that lacks a GUI and can be executed to provide services independently of user input. Example widgets may include a dynamically generated data table, a navigation bar, an authorization utility, a login interface, a data management tool, and/or so forth. Example gadgets may include programmatic layers to access server-side applications, network connectivity, and/or generally middle-tier or server-side computing functionality.

In some embodiments that are related to software development, an application framework that is developed to support rendering of features on an application web page may be stored at an application server. Application code that is developed to use the application framework to render a particular application web page that includes one or more features may be stored in a source code data store that is accessible to the application server. Feature codes of features that are developed using a variety of different programming languages are stored in a feature code data store. The feature codes may be executed to generate feature presentation codes that dictate the layout of the features in application web pages. The feature codes are hosted as FaaS web services that are accessible via Representational State Transfer (REST)ful application programming interfaces (APIs) in an application framework.

Likewise, content codes used to populate the features with content may be developed using a variety of programming languages and stored in a content code store. The content codes may be executed to retrieve content from a content data store so that features are populated with the content. The content codes are hosted as CaaS web services that are accessible via RESTful APIs of the application framework. Accordingly, these elements are used by the application server to dynamically generate application web page code for the particular application web page that includes one or more features. The application web page code is then rendered by a web browser to generate the particular application web page that presents the one or more features.

In other embodiments related to software development, the application server may store configuration web page code of a configuration web page that is developed to enable a user to modify one or more features rendered on an application web page. A configuration logic that is triggerable via the configuration web page may be stored in a logic store by the application server. The configuration logic is triggerable to enable an application server to retrieve the current settings that are used to render a feature and changeable attributes for the current settings using a FaaS web service. Subsequently, the configuration logic may direct the application server to encode the current settings and options corresponding to the changeable attributes into the configuration web page code of the configuration web page. The configuration web page code is then sent by the application server to a web browser for rendering into the configuration web page. The rendered configuration web page may be used to modify the current settings of the feature on the application web page.

In additional embodiments that are related to software runtime, a web browser may send a request to access an application web page to an application server. In some embodiments, the request may be a Hypertext Transfer Protocol (HTTP) request. In response to the request, the application server may execute an application code to dynamically generate application web page code for rendering by the web browser. During the generation of the application web page code, the application server may perform a series of tasks. In performing such tasks, the application server may invoke the application framework to support retrieval of feature codes of features from a FaaS data store and content code from a CaaS data store. The application server may further retrieve the feature code of a feature via a corresponding RESTful web service from a FaaS data store. The retrieved feature code is executed by the application server to generate feature presentation code that dictates the presentation layout of the feature. The application server may then incorporate the feature presentation code into the application web page code.

Further, content code that is associated with the feature presentation code of the feature may be retrieved by the application server from a CaaS data store via a RESTful web service. The content code is then executed by the application server to retrieve specific content for populating the feature from a content data store. The specific content may be bound to the content presentation code according to a binding map that is created from a manifest in the additional script. The binding map is a mapping of various fields in the feature that correspond to the specific content from the content data store. For example, a feature may have fields labeled first name and last name. The binding map stores the mapping of the first name and last name fields to data columns storing first and last names respectively. Subsequently, the specific content may be incorporated by the application server with the corresponding feature presentation code in the application web page code.

Once these tasks are complete, the application server may return the dynamically generated application web page code to the web browser, such as via an HTTP response. Accordingly, the web browser may interpret the application web page code to generate an application web page. The application web page code as interpreted by the web browser may include a script that directs the web browser to import the application framework to support the rendering of the feature. Subsequently, the application web page code may be rendered by the web browser into an application web page that includes the feature. In some embodiments, an application web page may be configured by corresponding application code to have multiple features. In such embodiments, the series of tasks may be performed by the application server for each feature to incorporate the multiple features into the application web page.

In further embodiments related to software runtime, a configuration web page presented by a web browser may be used to modify a feature that is to be rendered on an application web page to an application server. In various embodiments, a configuration logic may be triggered by a feature modification request to direct the application server to access the feature code of the feature to obtain configuration data that includes current settings for rendering the feature, as well as changeable attributes for the current settings. The configuration logic may further direct the application server to encode the current settings and options corresponding to the changeable attributes into configuration web page code for a configuration web page. The configuration web page is then sent by the application server to a web browser. Subsequently, changes to the current settings as received via the configuration web page are sent to the application server, such that the application server may modify the current settings in the feature code according to the changes. These modifications are reflected in the application web page by the application web server. When the web browser refreshes, either manually or in response to a software notification, the web browser renders the application web page with the modifications.

The use of FaaS and CaaS web services for populating an application web page with features that are coded in multiple different programming languages along with corresponding content may enable an organization to use software developers who do not have overlapping programming skills to collaboratively work on features for a web application. Further, the use of FaaS and CaaS development principles means that the application elements of an application are loosely coupled, so that the elements can be developed, tested, and maintained independently of one another. As a result, software development time and software downtime may be reduced, as changes to software components may be dynamically introduced at runtime. The techniques described herein may be implemented in a number of ways. Example implementations are provided below with reference to the following FIGS. 1-7.

Example Architecture

FIG. 1 illustrates an example architecture 100 that implements a programming language agnostic microservice-based software environment. The architecture 100 may include an application server 102, a computing device 104, and a computing device 106. The application server 102 may provide a web server that stores and delivers application web pages to client applications on client devices, such as the computing devices 104 and 106. The computing devices 104 and 106 may be connected to the application server 102 via a network. The network may include a wireless carrier network, a local area network (LAN), a larger network such as a wide area network (WAN), and/or a collection of networks, such as the Internet. In some embodiments, the client applications may be web browsers, such as the web browser 108 on the computing device 104, and the web browser 110 on the computing device 106.

The application server 102 may communicate with the client applications via Hypertext Transfer Protocol (HTTP) to deliver the application web pages in the form of HyperText Markup Language (HTML) documents, in which the documents may include text content, images, multimedia content, cascade style sheets (CSS), and/or scripts. The application server 102 may support server-side scripting via multiple scripting languages, such as Active Server Pages (ASP), Hypertext Preprocessor (PHP), JavaScript, and other scripting languages. Accordingly, the application server 102 may support the dynamical generation of web pages for web applications. The application server 102 may access multiple data stores via the network. The multiple data stores may include a logic store 112, a source code data store 114, a FaaS data store 116, and a CaaS data store 118. In various embodiments, the FaaS data store 116 and the CaaS data store 118 may be used to provide application web pages with features in the form of widgets and gadgets.

During a development phase, an application framework 122 may be developed by one or more developers to support rendering of features on application web pages. In various embodiments, the application framework 122 is a library that can be added to an HTML-based web page to implement dynamic page content rendering for the web page. The application framework 122 may serve to provide functions and logic components that can be invoked for generating features on web pages. For example, a logic component may be invoked to interface with and obtain data from multiple web services and/or data stores by routing requests and calling Representational State Transfer (REST)ful APIs. For instance, when activated by a script, the logic component may direct the application server 102 to retrieve the feature code via a corresponding RESTful web service and to retrieve the content code via a corresponding RESTful web server. In another example, functions of the application framework 122 may be invoked by scripts to place and render features on web pages according to predefined rules, application routines, and/or resources.

The application framework 122 may be stored in a data store of the application server 102. As used herein, Representational State Transfer (REST) refers to a software architecture style that defines constraints for creating web services that are interoperable by allowing requesting entities to access and manipulate web resources of resource providers using a predefined set of stateless operations. Stateless means that no state information is retained by either the sender or the receiver of a request. In other words, each of the sender and receiver of a request is unaware of the state of the other, and a request must contain all the information necessary to service the request.

Additionally, application codes that are developed by one or more developers may be stored in the source code data store 114. Such application codes are developed to dynamically generate the application web page codes for rendering application web pages. For example, the application code 124 is developed to use the application framework 122 to render a particular application web page that presents one or more features. In such an example, the features may include a data table, a navigation bar, an authorization utility, a login interface, a data management tool, etc. The application code may be developed using HTML, ASP, JavaServer Pages (JSP), ColdFusion, and/or so forth.

Further, one or more developers may develop feature codes, such as the feature code 126, in a variety of different programming languages. For example, the different programming languages may include C++, Java, Python, and/or so forth. The feature codes may be executed to generate feature presentation codes that dictate the layout of the multiple features in application web pages. The feature codes may be developed as RESTful FaaS web services that can be invoked via scripts. The scripts may be embedded in an application code, such as the application code 124. The feature codes may be accessed via web service interfaces, e.g., RESTful APIs, that can be invoked via predesignated web service calls or requests, regardless of the underlying programming language used to develop each of the multiple feature codes. The feature codes, such as the feature code 126, may be stored in the FaaS data store 116. The feature codes may include default settings for rendering the features on the application web pages. For example, the default settings for a data table that is presented on a web page may specify the number of rows and columns, the color scheme of the data table, the format and spacing of the data in the data table, etc.

The CaaS data store 118 may store multiple content codes, such as the content code 128, that are developed by one or more developers using multiple programming languages. The content codes may be executed by the application server 102 to retrieve content for populating features from a content data store, such as the content data store 120. For example, the content codes may include network addresses of servers, file directory pathways, and/or other information for locating and accessing the content data store. In some embodiments, the CaaS data store 118 may act as a content data store. In other embodiments, the content data store 120 may be an additional content data store that is maintained by or otherwise accessible to the application server 102. The content codes may be developed as RESTful CaaS web services that can be invoked via scripts. The scripts may be embedded in an application code, such as the application code 124. The content codes may be accessed via web service interfaces, e.g., RESTful APIs, that can be invoked via predesignated web service calls or requests, regardless of the underlying programming language used to develop each of the multiple content codes. In various embodiments, the content may include image data, multimedia data, text data, numerical data, and/or other types of data. In some instances, the data may be stored in Extensible Markup Language (XML) format, JavaScript Object Notation (JSON) format, and/or other formats. The content may be accessed via RESTful CaaS web services that are provided by the CaaS data store 118.

Thus, the application framework 122 and the elements that are stored in the various data stores may be used by the application server 102 to dynamically generate application web page code for an application web page that includes one or more features. The application web page code may be generated in response to a request that is initiated by the web browser 108. The application web page code is delivered to the web browser 108 for rendering into the application web page by the web browser 108. For example, the features of an application web page 130 as rendered by the web browser 108 may be software widgets and software gadgets that perform multiple functions. A software widget 134 is an element of a graphical user interface (GUI) that displays information in response to a user input or provides a specific way for a user to interact with an application. On the other hand, a software gadget 136 is a small computer program that lacks a GUI and can be executed to provide services independently of user input.

In other embodiments, the one or more developers may develop a configuration web page that enables a user to modify the way one or more features are presented on an application web page. For example, the application web page 130 may have a corresponding configuration web page 138 that is used to modify the way each feature on the application web page 130 is presented. The configuration web page code of the configuration web page 138 may be stored in the source code data store 114.

The logic store 112 may store configuration logics that are developed to enable the dynamic modifications of features as presented on application web pages. For example, in response to a request to modify a particular feature on an application web page 130, a configuration logic 132 may direct the application server 102 to obtain configuration data that includes the current settings used to render the particular feature, as well as changeable attributes for the current settings from the corresponding feature code of the feature. In various embodiments, the configuration logic 132 may be configured to direct the application server 102 to access the RESTful web service of the feature code in the FaaS data store 116 to obtain the configuration data for the feature. Subsequently, the configuration logic 132 encodes the current settings and options corresponding to the changeable attributes for the feature into the configuration web page code of the configuration web page 138. The application server 102 then returns the configuration web page code to a web browser for rendering into the configuration web page 138. In this way, a user may use the options as presented by the configuration web page 138 to modify the current settings for the feature. For example, the configuration web page 138 may include user controls, e.g., radio buttons, links, checkboxes etc., that can be activated by a user to the feature as displayed on an application web page 130.

In one scenario, the application web page 130 as displayed by the web browser 108 may include a web page link or other control objects that can be activated to request access to the configuration web page 138. In turn, the application server 102 may send the application web page code of the configuration web page 138 to the web browser 108 for rendering. In another scenario, an administrator web page as displayed by the web browser 110 may include a web page link or some other control object that can be activated to request access to the configuration web page 138.

During runtime, the web browser 108 may send a request to access an application web page to the application server 102. In response, the application server 102 may execute the application code 124 to generate application web page code 140. The application web page code 140 that is generated from the application code 124 may include HTML coding, one or more scripts, etc. for the application web page 130. For example, the HTML coding may indicate to a web browser that the application web page 130 is coding an HTML-based web page. The scripts may include a script that directs the web browser to import the application framework 122 to support the rendering of one or more features in the application web page 130.

Subsequently, the application server 102 may invoke the application framework 122 according to a script in the application code 124. The invocation of the application framework 122 may involve retrieving the application framework 122 from a storage memory and loading the application framework 122 into a working memory that is accessible to the application framework 122 for use. The invoked application framework 122 may support the retrieval of feature codes from the FaaS data store 116 and the retrieval of the content codes from the CaaS data store 118. For example, the invoked application framework 122 may include a logic component that interfaces with and obtains data from multiple web services and/or data stores by routing requests and calling RESTful APIs. Following the invocation of the application framework 122, the application server 102 may retrieve feature code 126 of a feature from the FaaS data store 116 according to an additional script in the application code 124. For example, the additional script may include a manifest with network addresses (e.g., a uniform resource identifier (URL), a uniform resource locator (URL), an IP address, etc.) of the RESTful web service for retrieving the feature code 126. Accordingly, the application server 102 may retrieve the feature code 126 for the feature from the FaaS data store 116 via the application framework 122, by using a network address of the corresponding RESTful web service.

The feature code 126 is then executed by the application server 102 to generate feature presentation code that dictates the presentation layout of the feature. The feature presentation code may include HTML coding, CSS, scripts, and/or other types of layout metadata. In various embodiments, the feature code 126 may contain the current settings for a layout of the feature that are coded by the application server 102 into the feature presentation code. In some instances, the current settings may be default setting originally programmed into the feature code. In other instances, the current settings may be modified settings saved by a user into the feature code. For example, the current settings for a feature that is a data table may specify the number of rows and columns, the color scheme of the data table, the format and spacing of the data in the data table, etc. The feature presentation code is then incorporated by the application server 102 into the application web page code 140. In various embodiments, the application server 102 may append the feature presentation code to the existing application web page code 140 and/or embed the feature presentation code into the application web page code 140.

Additionally, the application server 102 may retrieve content code 128 that corresponds to the feature from the CaaS data store 118 according to the additional script in the application code 124. For example, the manifest of the additional script may include a network address (e.g., a uniform resource identifier (URL), a uniform resource locator (URL), an IP address, etc.) of the RESTful web service for retrieving the content code 128. The manifest may further include a listing of the specific content to be retrieved for the feature. Accordingly, the application server 102 may retrieve the content code 128 from the CaaS data store 118 via the application framework 122, by using a network address of the corresponding RESTful web service. The content code 128 is then executed by the application server 102 to retrieve the specific content for populating the feature from a content data store, such as the content data store 120. For example, the content code 128 may include a network address of a server, a file directory pathway, and/or other information for locating and accessing the content data store. In some embodiments, the content code 128 may be executed to direct the application server 102 to use the application framework 122 to execute a query according to the manifest to retrieve the specific content from the content data store.

Subsequently, the application server 102 may further incorporate the specific content with the feature presentation code in the application web page code 140. For example, the application server 102 may use the manifest in the additional script to create a binding map that binds specific content to the feature. The binding map is used by the application server 102 to mark up the specific content with the feature code presentation code and/or embed the specific content into the feature presentation code. In other words, the application server 102 may use the binding map to populate the specific content into specific layout locations in the feature. For example, if the feature is a data table, the application server 102 may populate the rows and columns of the data table with specific content retrieved from the content data store. Following the population, the application server 102 may return the application web page code 140 to the web browser 108 for rendering.

In turn, the web browser 108 may use the application framework 122 to render an application web page 140 that includes the feature according to the application web page code. In various embodiments, the web browser 108 may import the application framework 122 according to a script in the application web page code 140. The application framework 122 may support the rendering of features using the feature presentation code and the specific content bound to the feature presentation code. For example, the application framework 122 may include predefined rules, application routines, and/or resources for rendering the features.

In some embodiments, the application code 124 may include multiple scripts for rendering multiple features. Each of these scripts may be processed in the same manner by the application server 102 to generate application web page code that codes multiple features. In this way, the rendering of a web page that includes one or more features is transformed into a series of small microservices that are performed in sequence, irrespective of the programming language used to code each feature.

In additional embodiments, an authorized user may use a configuration web page to modify the way that a particular application web page is generated for presentation. For example, the authorized user may use the configuration web page 138 to modify the particular application web page 130. In such an example, an authorized user may send a request to modify a feature that is rendered on the application web page 130 to the application server 102. The request may be sent via a link on the application web page 130 or an administrator web page that is accessed via a web browser (e.g., the web browser 110). In various embodiment, access to the configuration web page 138 may be protected by an authentication service of the application server 102. Accordingly, the authentication service may grant the authorized user access to the configuration web page 138 upon the authorized user submitting one or more valid authentication credentials to the authentication service. For example, the authentication credentials may include a username, a password, biometric data, an electronic certificate, and/or so forth.

In response, the application server 102 may call the configuration logic 132. The configuration logic 132 may retrieve configuration web page code (e.g., configuration web page code 142) of a configuration web page that is developed to enable the dynamic modification of the features. For example, the request may include a unique feature identifier of the feature, and the configuration logic 132 may retrieve the corresponding configuration web page code of a configuration web page that is also labeled with the unique feature identifier. Further, the configuration logic 132 may access the feature code 126 of the feature to obtain configuration data that includes current settings and changeable attributes of the current settings. The current settings may be the default settings for the changeable attributes or previously modified settings for the changeable attributes. For example, the current settings for a feature in the form of a data table may include a number of rows in the data table, a number of columns in the data table, a format for the data in the data table, and/or so forth. The application server 102 is then directed by the configuration logic 132 to encode the current settings and options corresponding to the changeable attributes for the current settings into the configuration web page code developed for the configuration web page 138. The configuration web page code is sent by the application server 102 to the web browser that initiated the request. In turn, the web browser may render the configuration web page 138 according to the configuration web page code. The configuration web page 138 as rendered may present the current settings and the options for the changeable attributes of the feature. For example, the options for the changeable attributes for the current settings may be presented via user controls, such as a drop-down box, a series of checkboxes, radio buttons, etc., which enable a user to select the desired attributes.

Subsequently, the configuration web page 138 may receive changes to the current settings and send the changes to the application server 102. The changes may be inputted by a user via the user controls that enable the user to select or input the desired changeable attributes. For example, instead of the number of rows in a data table being set to an attribute of "10" as specified by a current setting, the user may change the attribute to "15". In turn, the application server 102 may overwrite one or more current settings stored in the feature code 126 according to one or more corresponding changes. In some embodiments, the application server 102 may initiate a refresh of the application web page 130 that is presented by a web browser following the modification of the current settings stored in the feature code 126. In some embodiments, the configuration web page 138 may enable the user to modify the current settings of multiple features. Accordingly, the configuration logic 132 may be configured to retrieve the configuration data for each of the features and encode the modification options for each of the features in the configuration web page 138 in the same manner.

Example Application Server and Computing Device Components

Figure 2:
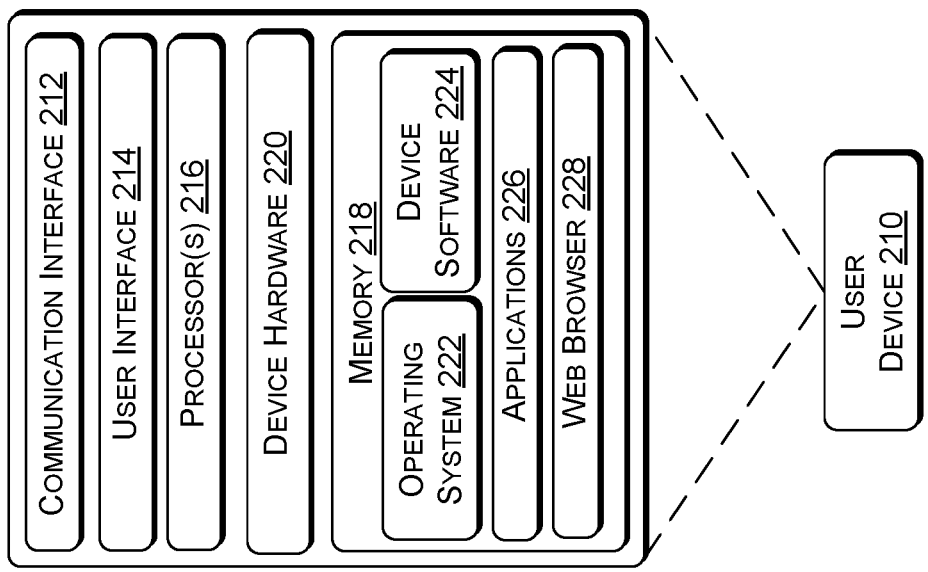
FIG. 2 is a block diagram showing various components of an application server and a computing device that support the implementation of microservice-based software development.
Figure 2:
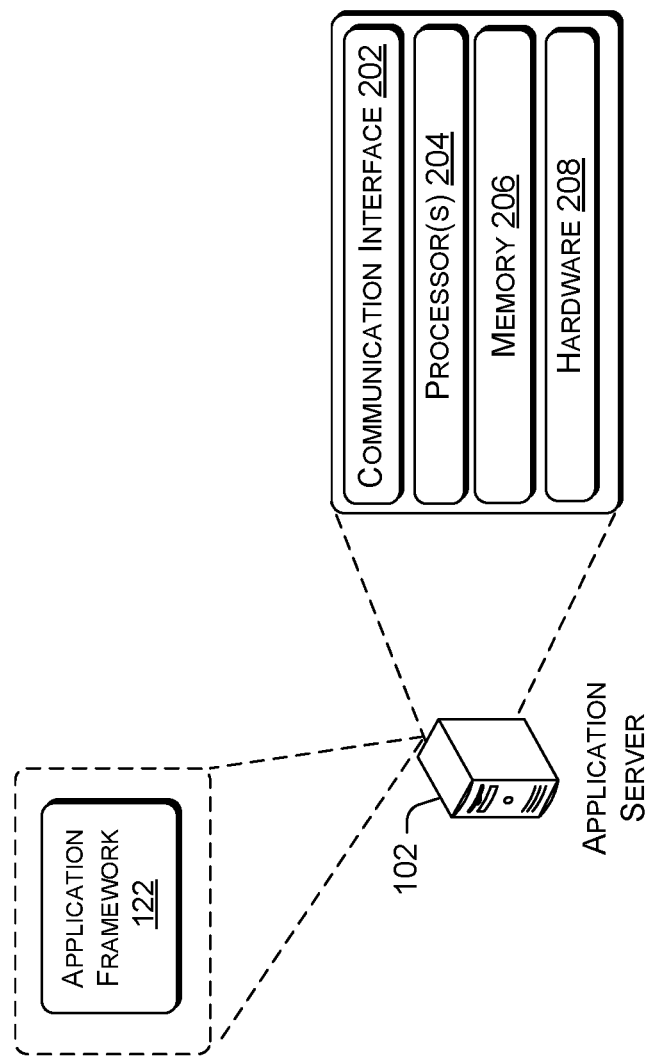

FIG. 2 is a block diagram showing various components of an application server and a computing device that support the implementation of microservice-based software development. The application server 102 may be implemented using one or more computing nodes. The computing nodes may include a communication interface 202, one or more processors 204, memory 206, and hardware 208. The communication interface 202 may include wireless and/or wired communication components that enable the application server 102 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the application server 102 or components thereof may be implemented using virtual computing devices in the form of virtual machines or software containers that are hosted in a computing cloud. The computing cloud may include a variety of disaggregated servers that provide virtual application server functionalities and virtual storage functionalities.

The application server 102 may provide a web server that supports server-side scripting via multiple scripting languages, ASP, PHP, JavaScript, and other scripting languages. Accordingly, the application server 102 may support the dynamical generation of web pages for web applications. The application server 102 may access multiple data stores via the network. The multiple data stores may include a logic store 112, a source code data store 114, a FaaS data store 116, a CaaS data store 118, and a content data store 120. The application framework 122 may be stored in a data store of the application server 102. In some various embodiments, the application server 102 may provide network portals that enable the one or more authorized developers to upload the application framework 122, the configuration logic 132, application codes, web page codes, feature codes and/or content into the various stores. The application server 102 may provide one or more software development environments for developing codes. For example, the software development environments may enable feature codes and/or content codes to be developed in multiple programming languages, as well as application codes to be generated from inputted programming source codes. For example, an application code may be developed using HTML, ASP, JSP, ColdFusion, and/or so forth. Thus, the application code may be compiled, translated, or otherwise converted from an inputted programming source code.

The software development environments may include network portals for releasing various software codes into the data stores for runtime. The authorized developers may be authenticated for access to the network portal via an authentication service of the application server 102. Accordingly, the authentication service may grant an authorized developer access to a network portal upon the developer submitting one or more valid authentication credentials to the authentication service. For example, the authentication credentials may include a username, a password, biometric data, an electronic certificate, and/or so forth. In alternative embodiments, the software development environments may be hosted separately from the application server 102.

As shown in FIG. 2, a user device 210 may be representative of the computing device 104 or the computing device 106. The user device 210 may include a communication interface 212, a user interface 214, one or more processors 216, memory 218, and device hardware 220. The communication interface 212 may include wireless and/or wired communication components that enable the electronic device to transmit or receive voice or data communication via the wireless carrier network, as well as other telecommunication and/or data communication networks.

The user interface 214 may enable a user to provide inputs and receive outputs from the 210. The user interface 214 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 218 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 220 may include a modem that enables the user device 210 to perform telecommunication and data communication with a network. The device hardware 220 may further include signal converters, antennas, hardware decoders and encoders, graphics processors, a universal integrated circuit card (UICC) or an embedded UICC (eUICC), and/or the like that enable the user device 210 to execute applications and provide telecommunication and data communication functions.

The one or more processors 216 and the memory 218 of the user device 210 may implement an operating system 222, device software 224, one or more applications 226, and a web browser 228. Such software may include routines, program instructions, objects, and/or data structures that are executed by the processors 216 to perform particular tasks or implement particular abstract data types.

The operating system 222 may include components that enable the user device 210 to receive and transmit data via various interfaces (e.g., user controls, communication interface 212, and/or memory input/output devices). The operating system 222 may also process data using the one or more processors 216 to generate outputs based on inputs that are received via the user interface 214. For example, the operating system 222 may provide an execution environment for the execution of the applications 226 and the web browser 228. The operating system 222 may include a presentation component that presents the output (e.g., display the data on an electronic display, store the data in memory, transmit the data to another electronic device, etc.).

The operating system 222 may include an interface layer that enables applications to interface with the modem and/or the communication interface 212. The interface layer may comprise public APIs, private APIs, or a combination of both public APIs and private APIs. Additionally, the operating system 222 may include other components that perform various other functions generally associated with an operating system. The device software 224 may include software components that enable the user device to perform functions. For example, the device software 224 may include basic input/output system (BIOS), bootrom, or a bootloader that boots up the user device 210 and executes the operating system 222 following power-up of the device.

The applications 226 may include applications that provide utility, entertainment, and/or productivity functionalities to a user of the user device 210. For example, the applications 226 may include telephony applications, electronic mail applications, remote desktop applications, navigation applications, office productivity applications, multimedia streaming applications, an online shopping application, and/or so forth. The web browser 228 may enable a user to access web pages provided by the application server 102, such as the application web page 130 and the configuration web page 138.

Example Processes

FIGS. 3-7 present illustrative processes 300-700 for implementing a programming language agnostic microservice-based software environment. Each of the processes 300-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described for each process is not intended to be construed as a limitation, and any number of the described blocks can be combined in any order and/or in parallel to implement the process. For discussion purposes, the processes 300-700 are described with reference to the architecture 100 of FIG. 1.

Figure 3:
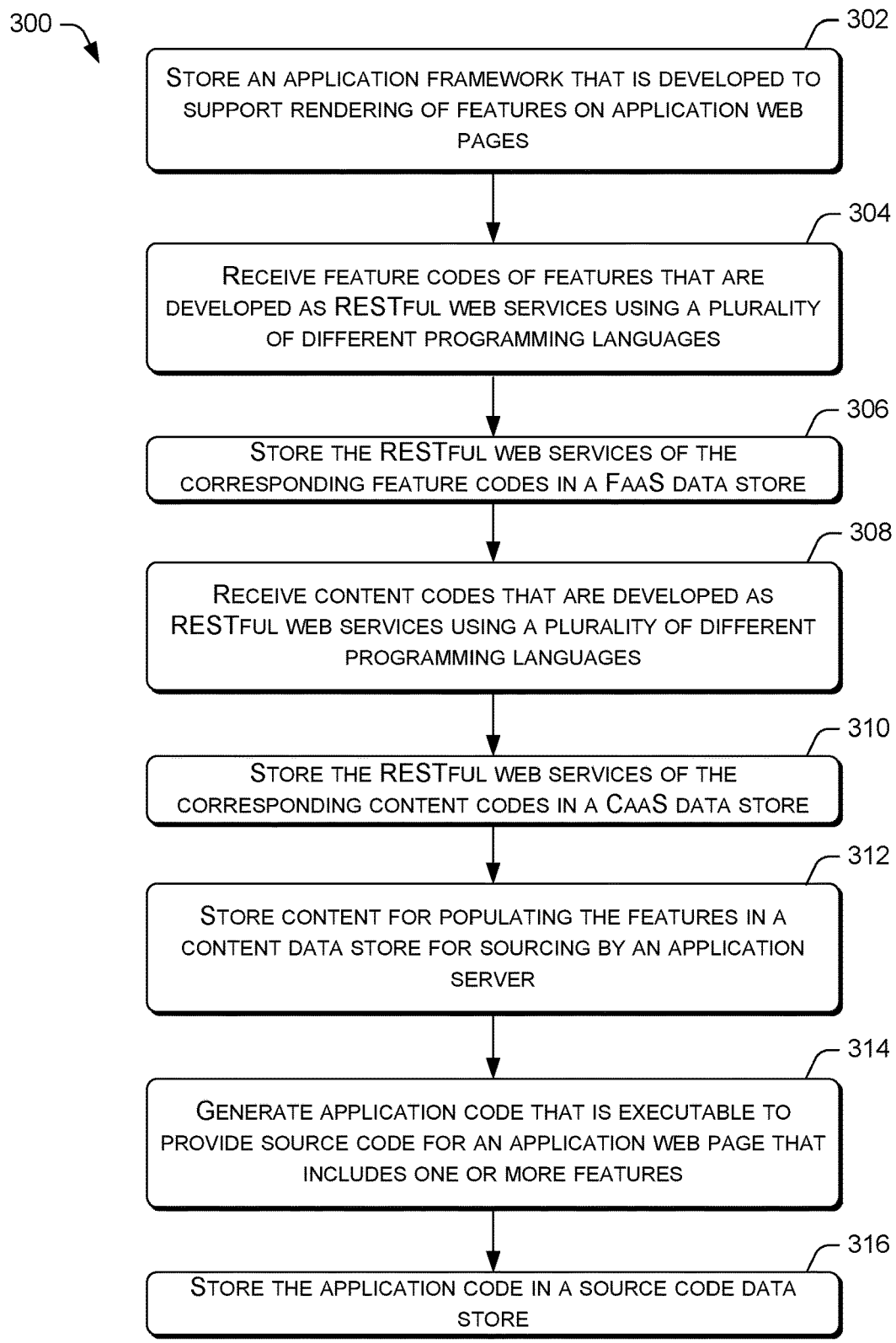
FIG. 3 is a flow diagram of an example process for storing software components that are developed for the implementation of microservice-based web application feature deployment.

FIG. 3 is a flow diagram of an example process 300 for storing software components that are developed for the implementation of microservice-based web application feature deployment. At block 302, the application server 102 may store the application framework 122 that is developed to support rendering of features on application web pages. In various embodiments, the application framework 122 may be stored at a data store of the application server 102.

At block 304, the application server 102 may receive feature codes of features that are developed as RESTful web services using a variety of different programming languages. In various embodiments, the feature codes are developed using one or more software development environments that are provided by the application server 102 or a different server. At block 306, the application server 102 may store the RESTful web services of the corresponding feature codes in a FaaS data store, such as the FaaS data store 116. The application server 102 may be directed by the application framework 122 to call such RESTful web services.

At block 308, the application server 102 may receive content codes that are developed for retrieving content to populate the features. The content codes may be developed as RESTful web services using a variety of different programming languages. In various embodiments, the content codes are developed using one or more software development environments that are provided by the application server 102 or a different server. At block 310, the application server 102 may store the RESTful web services that correspond to the content codes in a CaaS data store, such as the CaaS data store 118. The application server 102 may be directed by the application framework 122 to call such RESTful web services.

At block 312, the application server 102 may store content for populating the features in a content data store, such as the content data store 120. In some embodiments, the CaaS data store 118 may act as a content data store. In other embodiments, the content data store 120 may be an additional content data store that is maintained by or otherwise accessible to the application server 102. In various embodiments, the execution of content codes may cause the application server 102 to source the content from the content data store.

At block 314, the application server 102 may generate application code that is executable by the application server 102 to provide application web page code for an application web page that includes one or more features. In various embodiments, the application code may be compiled, translated, or otherwise converted from an inputted programming source code. The application code may be developed to use the application framework 122 to generate the application web page code, and the application web page code as generated may prompt a web browser to import the application framework 122 to present the one or more features.

At block 316, the application server 102 may store the application code that is developed in the source code data store 114. For example, the application code 124 may be stored in the source code data store 114.

Figure 4:
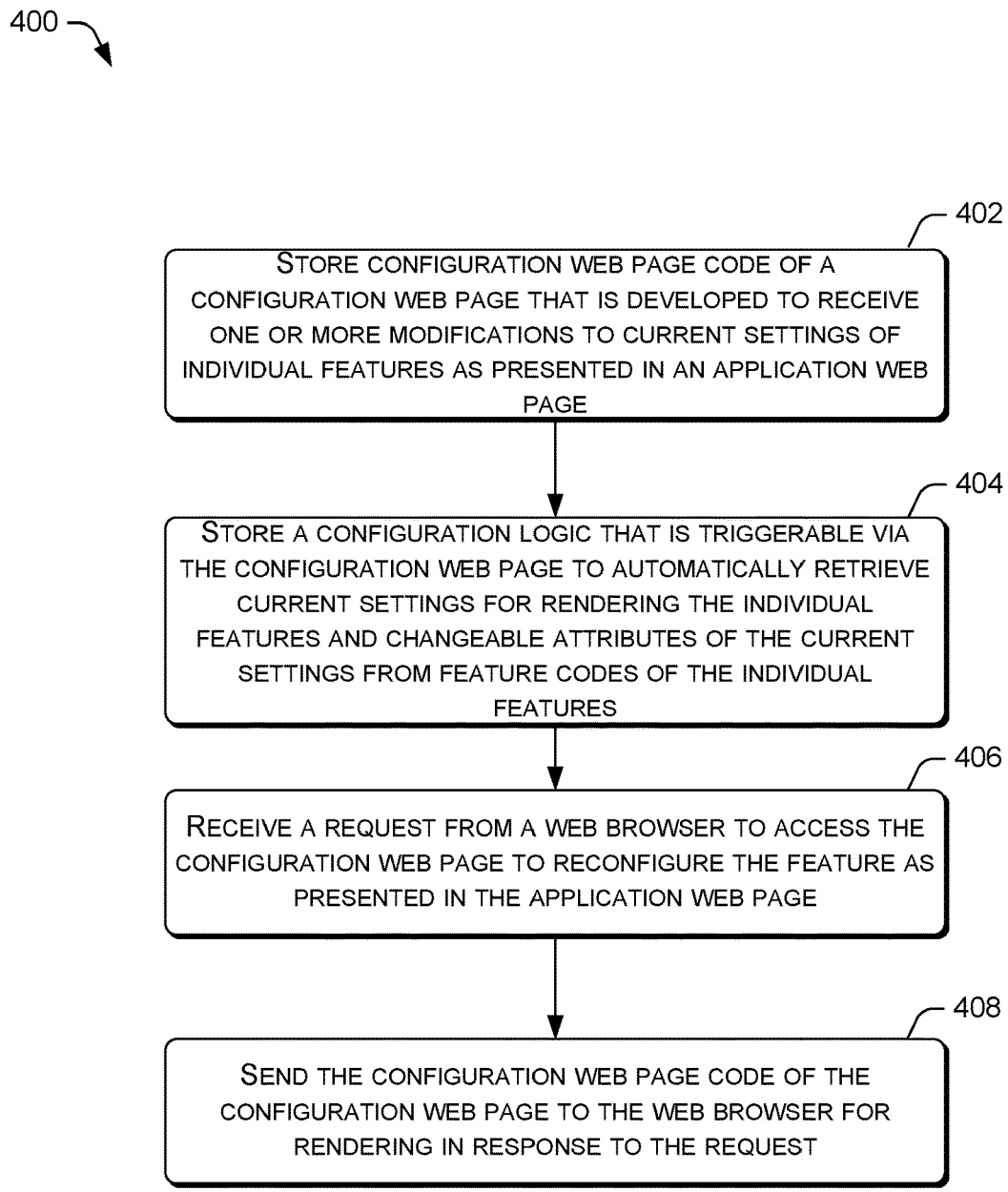
FIG. 4 is a flow diagram of an example process for storing software components that are developed for the dynamic configuration of web application features.

FIG. 4 is a flow diagram of an example process 400 for storing software components that are developed for the dynamic configuration of web application features. At block 402, the application server 102 may store configuration web page code of a configuration web page that is developed to receive one or more modifications to current settings of individual features as presented in an application web page. The current settings of each feature may control the layout of the feature in an application web page. In some embodiments, the configuration web page may be stored by the application server 102 in the source code data store 114. At block 404, the application server 102 may store a configuration logic 132 that is triggerable via the configuration web page to retrieve current settings for rendering the individual features and changeable attributes of the current settings for feature codes of the individual features.

At block 406, the application server 102 may receive a request from a web browser to access the configuration web page to reconfigure the feature as presented in the application web page. In various embodiments, the request may be initiated via a web page link on an administrator web page or on the application web page itself. At block 408, the application server 102 may send the configuration web page code of the configuration web page to the web browser for rendering in response to the request.

Figure 5:
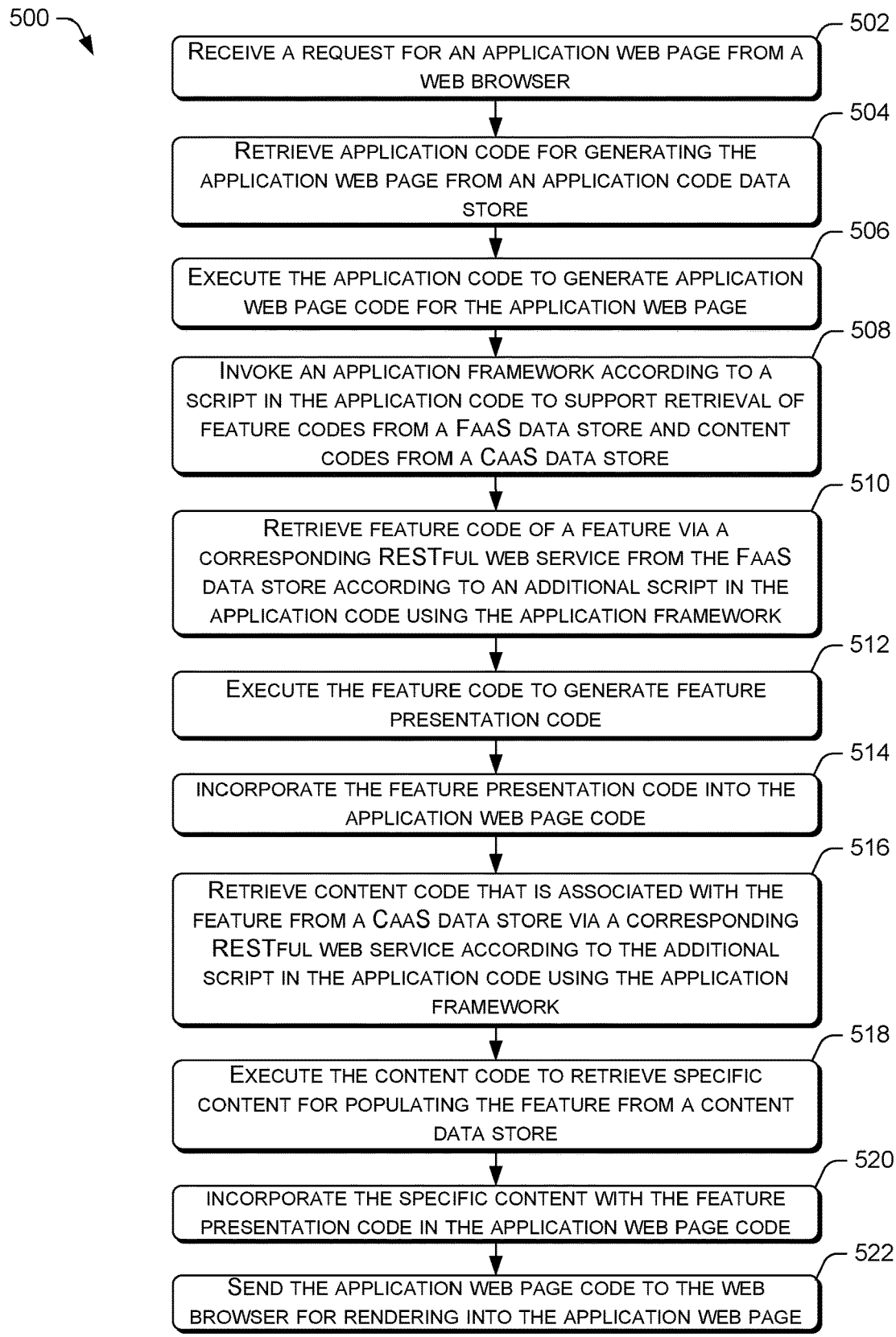
FIG. 5 illustrates a flow diagram of an example process for dynamically generating an application web page that includes using microservice-based feature retrieval and content retrieval.

FIG. 5 illustrates a flow diagram of an example process 500 for dynamically generating an application web page that includes using microservice-based feature retrieval and content retrieval. At block 502, the application server 102 may receive a request for an application web page from the web browser 108. The application server 102 may provide a web server that stores and delivers application web pages to client applications on client devices. In various embodiments, the request may be an HTTP request. At block 504, the application server 102 may retrieve the application code for generating the application web page from the source code data store 114.

At block 506, the application server 102 may execute the application code to dynamically generate application web page code for the application webpage. The application web page code may include HTML coding, one or more scripts, etc. For example, the HTML coding may indicate to a web browser that the application web page 130 is coding an HTML-based web page. The scripts may include a script that directs a web browser to import the application framework 122 to support the rendering of one or more features in the application web page.

At block 508, the application server 102 may invoke the application framework 122 according to a script in the application code, in which the application framework 122 supports the retrieval of feature codes from the FaaS data store 116 and content codes from the CaaS data store 118. At block 510, the application server 102 may retrieve a feature code of a feature via a corresponding RESTful web service from the FaaS data store 116 according to an additional script in the application code using the application framework 122.

At block 512, the application server 102 may execute the feature code to generate feature presentation code. In various embodiments, the feature presentation code may dictate the layout of the multiple features in application web pages. At block 514, the application server 102 may incorporate the feature presentation code into the application web page code. In various embodiments, the application server 102 may append the feature presentation code to the existing application web page code and/or embed the feature presentation code into the application web page code.

At block 516, the application server 102 may retrieve a content code that is associated with the feature from the CaaS data store 118 via a corresponding RESTful web service according to the additional script in the application code using the application framework 122. At block 518, the application server 102 may execute the content code to retrieve specific content for populating the feature from a content data store, such as the content data store 120. In some embodiments, the CaaS data store 118 may act as a content data store. In other embodiments, the content data store 120 may be an additional content data store that is maintained by or otherwise accessible to the application server 102. At block 520, the application server 102 may incorporate the specific content with the feature presentation code in the application web page code. In various embodiments, the application server 102 may mark up the specific content with the feature presentation code and/or embed the specific content into the feature presentation code. At block 522, the application server 102 may send the application web page code to the web browser for rendering into the application web page.

In some embodiments, the application code may include other scripts that specify the rendering of one or more additional features that are coded in an identical programming language or different programming languages. Accordingly, the blocks 510-520 may be repeated for each of these one or more additional features. Further, the application web page code may contain additional text content, images, multimedia content, CSS, etc. that are also rendered by the web browser prior to and/or following the rendering of each feature.

Figure 6:
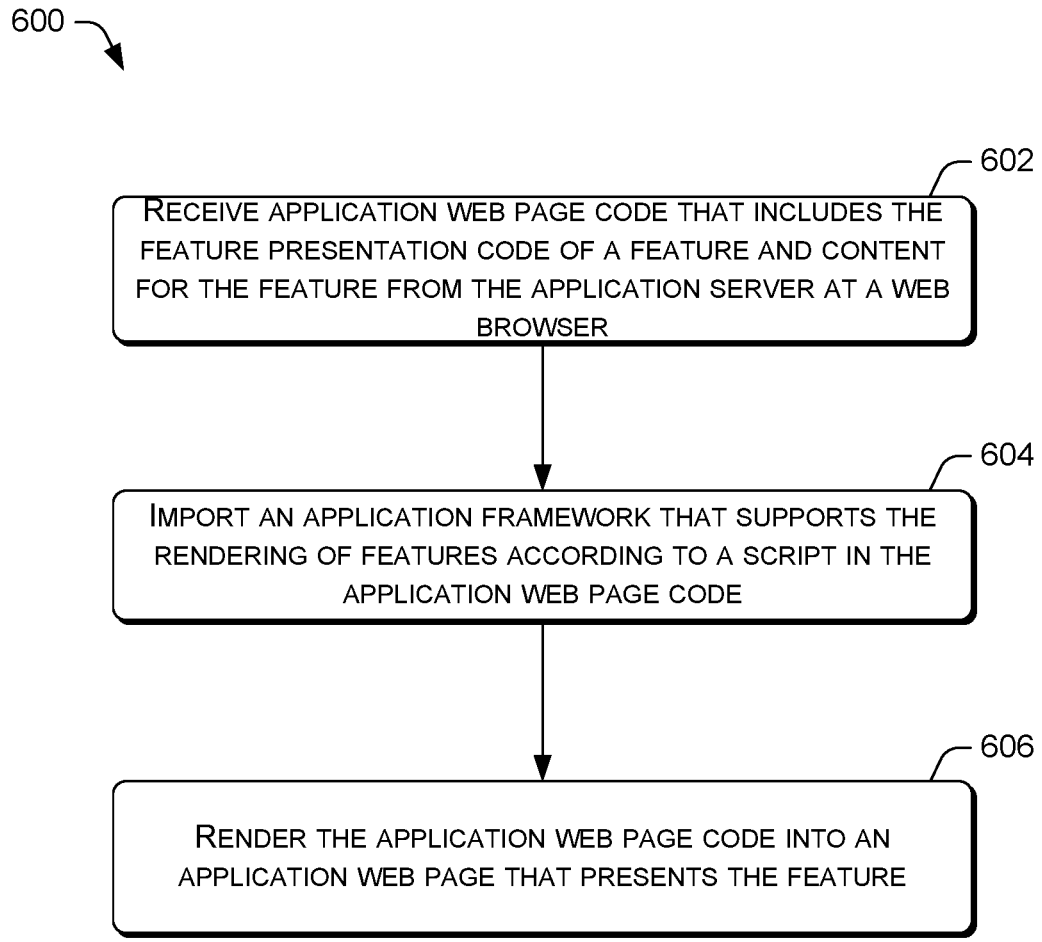
FIG. 6 illustrates a flow diagram of an example process for a web browser to render an application web page using an application framework that supports the rendering of features.

FIG. 6 illustrates a flow diagram of an example process 600 for a web browser to render an application web page using an application framework that supports the rendering of features. At block 602, a web browser, such as the web browser 108, may receive application web page code that includes the feature presentation code of a feature and content for the feature from the application server 102. At block 604, the web browser may import the application framework 122 to support the rendering of features according to a script in the application web page code. In various embodiments, the application framework 122 may include predefined rules, application routines, and/or resources that are used by the web browser to render the feature.

At block 606, the web browser may render the application web page code into an application web page that presents the feature. In other embodiments, the application web page code may include feature presentation codes and content of multiple features. Accordingly, the web browser may render such application web page code into an application web page that presents the multiple features.

Figure 7:
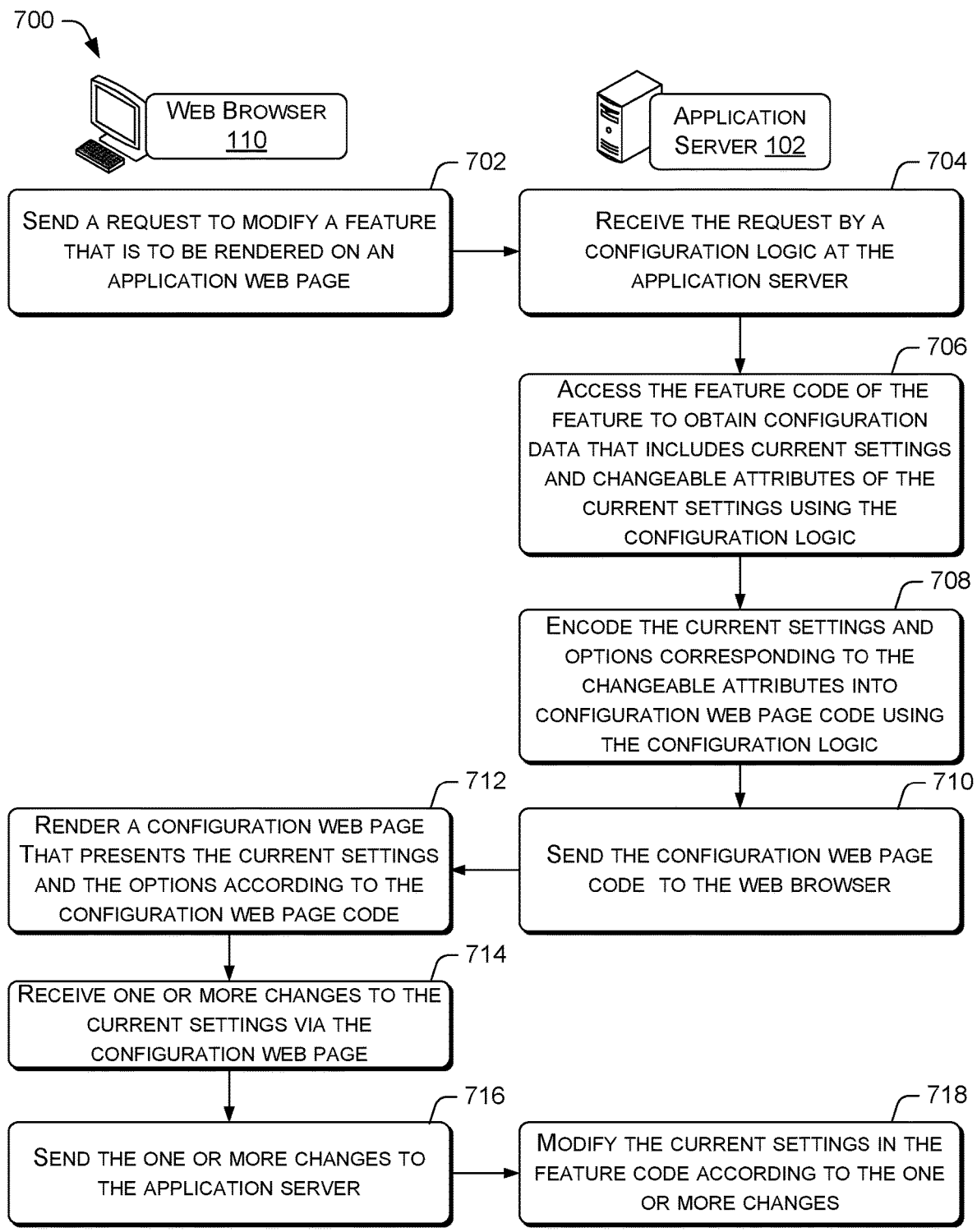
FIG. 7 is a flow diagram of an example process for rendering a configuration web page for dynamically configuring application web page features.

FIG. 7 is a flow diagram of an example process 700 for rendering a configuration web page for dynamically configuring application web page features. At block 702, a web browser, such as the web browser 110, may send a request to modify a feature that is to be rendered on an application web page. The request may be initiated by an authorized user that is validated by an authentication service of the application server 102. At block 704, the request may be received by a configuration logic at the application server 102. In various embodiments, the application server 102 may receive the request and then call the configuration logic to process the request. In turn, the configuration logic may retrieve the configuration web page code for a configuration web page that is developed to enable the dynamic configuration of the feature.

At block 706, the application server 102 may be directed by the configuration logic to access feature code of the feature to obtain configuration data that includes current settings and changes attributes of the current settings in response to the request. In various embodiments, the request may include a network address of a RESTful web service that corresponds to the feature code. Accordingly, the application server 102 may be directed by the configuration logic to access the feature code as a RESTFUL web service using the network address. At block 708, the application server 102 may be directed by the configuration logic to encode the current settings and options corresponding to the changeable attributes into configuration web page code of the configuration web page. At block 710, the application server 102 may send the configuration web page code to the web browser.

At block 712, the web browser may receive the configuration web page code. In turn, the web browser may render a configuration web page that presents the current settings and options corresponding to the changeable attributes for the current settings according to the configuration web page code. For example, the changeable attributes for the current settings may be presented via user controls, such as a drop-down box, a series of checkboxes, radio buttons, etc., which enable a user to select the desired attributes.

At block 714, the web browser may receive one or more changes to the current settings via the configuration web page. In various embodiments, the one or more changes may be inputted by a user via the user controls that enable the user to select the desired attribute. At block 714, the web browser may send the one or more changes to the application server 102.

At block 716, the application server 102 may modify the current settings in the configuration logic according to the one or more changes to the current settings. In some embodiments, the application server 102 may initiate a refresh of the application web page by the web browser. The refreshed version may present features according to the changed settings. In response, the web browser may present a refreshed version of the application web page. In other embodiments, a new version of the application web page may be presented when a user requests a refresh or a subsequent loading of the web page from a web browser.

The use of FaaS and CaaS web services for populating an application web page with feature codes of features that are coded in multiple different programming languages along with corresponding content may enable an organization to use software developers who do not have overlapping programming skills to collaboratively work on features for a web application. Thus, traditional overhead associated with recruiting, hiring, and managing software developers for each software development project according to their special skills, training, and certifications may be reduced or eliminated. Further, the use of FaaS and CaaS development principles means that the application elements of an application are loosely coupled, so that the elements can be developed, tested, and maintained independently of one another, as changes to software components may be dynamically introduced at runtime. As a result, software development time and software downtime may be reduced.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   executing, at an application server, an application code to generate application web page code for an application web page;
   invoking, at the application server, an application framework according to a script in the application code, the application framework including logic components that direct the application server to retrieve feature codes that generate feature presentation codes of features from a Feature as a Service (FaaS) data store and content codes from a Content as a Service (CaaS) data store via corresponding Representational State Transfer (REST)ful web services, and RESTful application program interfaces (APIs) for accessing the corresponding RESTful web services of the FaaS data store and the CaaS data store;
   retrieving, via the application server, a feature code of a feature via a corresponding RESTful web service from the FaaS data store according to an additional script in the application code using the application framework;
   executing, at the application server, the feature code to generate feature presentation code that is incorporated into the application web page code of the application web page, the feature presentation code dictating a layout of the feature in the application web page;
   retrieving, via the application server, content code that is associated with the feature from the CaaS data store via a corresponding RESTful web service according to the additional script in the application code using the application framework;
   executing, at the application server, the content code to retrieve specific content for populating the feature from a content data store, and incorporating the specific content with the feature presentation code in the application web page code; and
   sending, via the application server, the application web page code to a web browser on a computing device for rendering into the application web page.

2. The computer-implemented method of claim 1, wherein the application framework is configured to direct the application server to retrieve the feature code from the FaaS data store via the corresponding RESTful web service, and to retrieve the content code from the CaaS data store via the corresponding RESTful web service.

3. The computer-implemented method of claim 1, wherein the application code is executed in response to a request to access the application web page that originated from the web browser.

4. The computer-implemented method of claim 1, wherein the feature includes a software widget that uses a graphical user interface to display information and perform a function in response to a user input, or a software gadget that lacks a graphical user interface and provides a function without the user input via the graphical user interface.

5. The computer-implemented method of claim 1, wherein at least one of the feature codes stored in the FaaS data store and the content codes stored in the CaaS data store are coded in a plurality of programming languages.

6. The computer-implemented method of claim 1, further comprising:
   receiving, at the application server, a request to modify a feature that is to be rendered for the application web page;
   calling, via the application server, a configuration logic to access feature code of the feature via the corresponding RESTful web service to obtain current settings and changeable attributes of the current settings for rendering on a configuration web page at the web browser; and
   modifying, via the application server, the current settings based on changes to the changeable attributes of the current settings as received from the configuration web page.

7. A system, comprising:
   one or more processors; and
   memory including a plurality of computer-executable components that are executable by the one or more processors to perform a plurality of actions, the plurality of actions comprising:
      executing, at an application server, an application code to generate application web page code for an application web page;
      invoking, at the application server, an application framework according to a script in the application code, the application framework including logic components that direct the application server to retrieve feature codes that generate feature presentation codes of features from a Feature as a Service (FaaS) data store and content codes from a Content as a Service (CaaS) data store via corresponding Representational State Transfer (REST)ful web services, and RESTful application program interfaces (APIs) for accessing the corresponding RESTful web services of the FaaS data store and the CaaS data store;
      retrieving, at the application server, a feature code of a feature via a corresponding RESTful web service from the FaaS data store according to an additional script in the application code using the application framework;
      executing, at the application server, the feature code to generate feature presentation code that is incorporated into the application web page code of the application web page, the feature presentation code dictating a layout of the feature in the application web page;
      retrieving, at the application server, content code that is associated with the feature from the CaaS data store via a corresponding RESTful web service according to the additional script in the application code using the application framework;
      executing, at the application server, the content code to retrieve specific content for populating the feature from a content data store, and incorporating the specific content with the feature presentation code in the application web page code; and sending, via the application server, the application web page code to a web browser on a computing device for rendering into the application web page.

8. The system of claim 7, wherein at least one of the feature codes stored in the FaaS data store and the content codes stored in the CaaS data store are coded in a plurality of programming languages.

9. One or more non-transitory computer-readable media storing computer-executable instructions that upon execution cause one or more processors to perform acts comprising:

executing, at an application server, an application code to generate application web page code for an application web page;

invoking, at the application server, an application framework according to a script in the application code, the application framework including logic components that direct the application server to retrieve feature codes that generate feature presentation codes of features from a Feature as a Service (FaaS) data store and content codes from a Content as a Service (CaaS) data store via corresponding Representational State Transfer (REST)ful web services, and RESTful application program interfaces (APIs) for accessing the corresponding RESTful web services of the FaaS data store and the CaaS data store;

retrieving, at the application server, a feature code of a feature via a corresponding RESTful web service from the FaaS data store according to an additional script in the application code using the application framework;

executing, at the application server, the feature code to generate feature presentation code that is incorporated into the application web page code of the application web page, the feature presentation code dictating a layout of the feature in the application web page;

retrieving, at the application server, content code that is associated with the feature from the CaaS data store via a corresponding RESTful web service according to the additional script in the application code using the application framework;

executing, at the application server, the content code to retrieve specific content for populating the feature from a content data store, and incorporating the specific content with the feature presentation code in the application web page code; and sending, via the application server, the application web page code to a web browser on a computing device for rendering into the application web page.

10. The one or more non-transitory computer-readable media of claim 9, wherein the application code is executed in response to a request to access the application web page that originated from the web browser.

11. The one or more non-transitory computer-readable media of claim 9, wherein the acts further comprise creating a binding map that binds the specific content from the content data store to the feature according to a manifest in the additional script, and wherein the executing the content code includes executing the content code to retrieve the specific content according to the binding map.

12. The one or more non-transitory computer-readable media of claim 9, wherein the application web page code includes another script that directs the web browser to import the application framework that supports the rendering of the feature by the web browser.

13. The one or more non-transitory computer-readable media of claim 9, wherein a manifest in the additional script includes a network address of the RESTful web service that corresponds to the feature code and an additional network address of the additional RESTful web service for retrieving the content code.

14. The one or more non-transitory computer-readable media of claim 9, wherein the feature includes a software widget that uses a graphical user interface to display information and perform a function in response to a user input, or a software gadget that lacks a graphical user interface and provides a function without the user input via the graphical user interface.

15. The one or more non-transitory computer-readable media of claim 9, wherein at least one of the feature codes stored in the FaaS data store and the content codes stored in the CaaS data store are coded in a plurality of programming languages.

16. The one or more non-transitory computer-readable media of claim 9, wherein the feature includes a data table, a navigation bar, an authorization utility, a login interface, or a data management tool.

17. The one or more non-transitory computer-readable media of claim 9, wherein the acts further comprise:

receiving a request to modify a feature that is to be rendered for the application web page;

calling a configuration logic to access feature code of the feature via the corresponding RESTful web service to obtain current settings and changeable attributes of the current settings for rendering on a configuration web page at the web browser; and modifying the current settings based on changes to the changeable attributes of the current settings as received from the configuration web page.

18. The one or more non-transitory computer-readable media of claim 17, wherein the acts further comprise initiating a refresh of the application web page by the web browser to present a modified version of the feature.

19. The one or more non-transitory computer-readable media of claim 17, wherein the current settings and options corresponding to the changeable attributes are encoded into a configuration web page code of the configuration web page, and wherein the configuration web page is rendered by the web browser according to the configuration web page code.

20. The one or more non-transitory computer-readable media of claim 17, wherein the receiving the request includes receiving the request from an authorized user that is authenticated by an authentication service.

* * * * *